United States Patent
Zhang (10) Patent No.: US 10,609,353 B2
(45) Date of Patent: Mar. 31, 2020

(54) SYSTEMS AND METHODS FOR GENERATING AND DISPLAYING STEREOSCOPIC IMAGE PAIRS OF GEOGRAPHICAL AREAS

(71) Applicant: University of New Brunswick, Fredericton (CA)

(72) Inventor: Yun Zhang, Fredericton (CA)

(73) Assignee: University of New Brunswick, Frederiction, NB ( * ) Notice: Subject to any disclaimer, the term of this patent is extended or adjusted under 35 U.S.C. 154(b) by 167 days.

(21) Appl. No.: 14/902,807

(22) PCT Filed: Jul. 4, 2014

(86) PCT No.: PCT/CA2014/000540
§ 371 (c)(1),
(2) Date: Jan. 4, 2016

(87) PCT Pub. No.: WO2015/000060
PCT Pub. Date: Jan. 8, 2015

(65) Prior Publication Data
US 2016/0173850 A1   Jun. 16, 2016

(30) Foreign Application Priority Data

Jul. 4, 2013   (CA) ..................... 2820305

(51) Int. Cl.
| H04N 13/00 | (2018.01) |
| H04N 13/122 | (2018.01) |
| H04N 13/189 | (2018.01) |
| H04N 13/194 | (2018.01) |
| H04N 13/302 | (2018.01) |

(Continued)

(52) U.S. Cl.
CPC ......... *H04N 13/122* (2018.05); *G09B 29/005* (2013.01); *H04N 13/111* (2018.05); *H04N 13/189* (2018.05); *H04N 13/194* (2018.05); *H04N 13/261* (2018.05); *H04N 13/275* (2018.05); *H04N 13/302* (2018.05)

(58) Field of Classification Search
CPC .......... H04N 13/0018; H04N 13/0011; H04N 13/0055; H04N 13/0059; H04N 13/026; H04N 13/0275; H04N 13/0402; G09B 29/005
USPC .......................................... 348/43
See application file for complete search history.

(56) References Cited

U.S. PATENT DOCUMENTS

| 6,169,553 B1 | 1/2001 | Fuller |
| 6,970,593 B2 | 11/2005 | Furukawa |

(Continued)

FOREIGN PATENT DOCUMENTS

| WO | WO02/29360 A2 | 4/2002 |
| WO | WO2013188552 A2 | 12/2013 |

OTHER PUBLICATIONS

S. Knorr, "The Avoidance of Visual Discomfort and Basic Rules for Producing "Good 3D" Pictures", SMPTE Motion Imaging Journal, Oct. 2012.

(Continued)

*Primary Examiner* — Hee-Yong Kim
(74) *Attorney, Agent, or Firm* — Eugene F. Derényi; Fogler, Rubinoff LLP (57) ABSTRACT

In certain embodiments, a system and method for generating a stereoscopic image pair from a 2D satellite or aerial image and a 3D model.

35 Claims, 4 Drawing Sheets

(51) Int. Cl.
G09B 29/00 (2006.01)
H04N 13/275 (2018.01)
H04N 13/261 (2018.01)
H04N 13/111 (2018.01)

(56) References Cited

U.S. PATENT DOCUMENTS

| | | | |
|---|---|---|---|
| 8,026,929 | B2 | 9/2011 | Naimark |
| 8,295,554 | B2 | 10/2012 | Francini et al. |
| 8,472,746 | B2 | 6/2013 | Wei |
| 8,687,018 | B1 | 4/2014 | Stout |
| 2002/0059207 | A1 | 5/2002 | Shimazu |
| 2003/0014224 | A1 | 1/2003 | Guo |
| 2003/0137673 | A1 | 7/2003 | Cox |
| 2005/0220363 | A1* | 10/2005 | Oldroyd ............ G01C 11/00 382/294 |
| 2008/0111815 | A1 | 5/2008 | Graves |
| 2008/0238941 | A1 | 10/2008 | Kinnan |
| 2008/0310756 | A1 | 12/2008 | Tao |
| 2008/0310757 | A1 | 12/2008 | Wolberg et al. |
| 2009/0198767 | A1* | 8/2009 | Jakobson ........... G01C 21/3679 709/203 |
| 2009/0322742 | A1 | 12/2009 | Muktinutalapati |
| 2009/0322860 | A1 | 12/2009 | Zhang |
| 2010/0182316 | A1 | 7/2010 | Akbari et al. |
| 2010/0201707 | A1 | 8/2010 | Rasmussen |
| 2011/0148866 | A1 | 6/2011 | Chu |
| 2012/0105439 | A1 | 5/2012 | Blumenthal et al. |
| 2012/0105581 | A1 | 5/2012 | Berestov |
| 2012/0106785 | A1 | 5/2012 | Karafin et al. |
| 2012/0133640 | A1 | 5/2012 | Chin |
| 2012/0176477 | A1 | 7/2012 | Givon |
| 2012/0188334 | A1 | 7/2012 | Fortin et al. |
| 2013/0009950 | A1 | 1/2013 | Ben David |
| 2013/0009952 | A1 | 1/2013 | Tam et al. |
| 2013/0294684 | A1 | 11/2013 | Lipton et al. |
| 2013/0321389 | A1 | 12/2013 | Orderud |

OTHER PUBLICATIONS

Wan—Yen Lo et al., "Stereoscopic 3D Copy & Paste", Journal ACM Transactions on Graphics, vol. 29, No. 6, Article 147, Publication date: Dec. 2010.
Manuel Lang et al., "Nonlinear Disparity Mapping for Stereoscopic 3D", Journal ACM Transactions on Graphics, vol. 29, No. 4, Article 75, Publication date: Jul. 2010.
R. Phan and Dimitrios Androutsos, "Robust Semi-Automatic Depth Map Generation in Unconstrained Images and Video Sequences for 2D to Stereoscopic 3D Conversion", IEEE Transactions on Multimedia, vol. 16, No. 1, Jan. 2014.
S. Hadjitheophanous et al., "Towards Hardware Stereoscopic 3D Reconstruction a Real-Time FPGA Computation of the Disparity Map", Design, Automation & Test in Europe Conference & Exhibition (DATE), Date of Conference: Mar. 8-12, 2010.
Andrew Maimone et al., "Focus 3D: Compressive Accommodation Display", Journal ACM Transactions on Graphics(TOG) 32 (5), 2013.
Wa James Tam et al., "Stereoscopic 3D—TV: Visual Comfort". IEEE Transactions on Broadcasting, Jun. 2011, vol. 57, Issue 2, , pp. 335-346.
Liang Zhang and Wa James Tam, "Stereoscopic Image Generation Based on Depth Images for 3D TV". IEEE Transactions on Broadcasting, Jun. 2005 ,vol. 51, No. 2.
S. Battiato et al., "3 D Stereoscopic Image Pairs by Depth-Map Generation", Proceedings of the 2nd International Symposium on 3D Data Processing, Visualization, and Transmission (3DPVT'04), Date of Conference: Sep. 6-9, 2004.
Yue Feng, Jinchang Ren, Jianmin Jiang, "Object-Based 2D-to-3D Video Conversion for Effective Stereoscopic content Generation in 3D-TV Applications", IEEE Transactions on Broadcasting, Jun. 2011, vol. 57, No. 2, pp. 500-509.
Maged N. Kamel Boulos and Larry R. Robinson, "Web GIS in practice VII: stereoscopic 3-D solutions for online maps and virtual globes". Oct. 22, 2009, "International Journal of Health Geographics".
Bourke, "Calculating Stereo Pairs", Jul. 1999.
Carvalho, "Evaluation of 2D and 3D Map Presentation for Geo-Visualization", Bachelor Thesis, University of Gavle, Faculty of Engineering and Sustainable Development. Jun. 2011.
Zhang et al., "3D-TV Content Creation: Automatic 2D-to-3D Video Conversion",IEEE Transactions on Broadcasting, Jun. 2011, vol. 57, No. 2 ,pp. 372-383.
Croitoru et al., "Single and Stereo Based 3D Metrology From High-Resolution Imagery: Methodologies and Accuracies". Jul. 2004, Geo-Imagery Bridging Continents, XXth ISPRS Congress, Istanbul, Turkey.
C Baillard ,H.Martie,"3-D Reconstruction of Urban Scenes from Aerial Stereo Imagery: A Focusing Strategy", Computer Vision and Image Understanding, vol. 76, No. 3, Dec. 1999, pp. 244-258.
Microimages—Google maps stereoscopic 3D view, http://www.microimages.com/geodata-htm/stereo/index.htm, accessed Feb. 22, 2016.
SketchUp—Integrate your 3D models into Google Earth, http://www.sketchup.com/3Dfor/urban-planning, accessed Feb. 22, 2016.
StereoGIS by SimWright, http://www.simwright.com/stereogis.htm, accessed Feb. 22, 2016.
Google Street View, from Wikipedia, the free encyclopedia, https://en.wikipedia.org/wiki/Google_Street_View, accessed Feb. 22, 2016.
Google Earth, from Wikipedia, the free encyclopedia, https://en.wikipedia.org/wiki/Google_Earth, accessed Feb. 22, 2016.
CityEngine, from Wikipedia, the free encyclopedia, https://en.wikipedia.org/wiki/CityEngine, accessed Feb. 22, 2016.
Keyshot, How it works, https://www.keyshot.com/how-it-works/, accessed Feb. 22, 2016.
Google Maps 5.0 hits Android, includes new 3D map view and offline Navigation, Paul Miller, Dec. 16, 2010, @futurepaul, http://www.engadget.com/2010/12/16/google-maps-5-0-hits-android-includes-new-3d-map-view-and-offli/. Accessed Feb. 22, 2016.
YouTube video screen shots "Automatic 3D city modeling", https://www.youtube.com/watch?v=mSp4Jhq67vM, accessed Feb. 10, 2016.
International Search Report and Written Opinion of the International Searching Authority of PCT Application No. PCT/CA2014/000450 dated Nov. 13, 2014.
S. Knorr, "Basic Rules for good 3D and avoidance of visual discomfort . . . " imcube 3, Technical Information Sep. 2011.

* cited by examiner

PRIOR ART

SYSTEMS AND METHODS FOR GENERATING AND DISPLAYING STEREOSCOPIC IMAGE PAIRS OF GEOGRAPHICAL AREAS

FIELD OF THE INVENTION

The present invention relates generally to stereoscopic image pairs and three-dimensional ("3D") model generation, and more specifically, to the field of generating and displaying stereoscopic image pairs of geographical areas, and associated systems and methods.

BACKGROUND OF THE INVENTION

Satellite and aerial images and line maps are available for many parts of the world. Such images and maps are increasingly available online. Google Maps™ and Bing Maps™, for example, provide online access to two-dimensional ("2D") satellite images and 2D line maps for many geographical areas.

Satellite and aerial images may also be viewed as stereoscopic 3D using two images which form a stereoscopic image pair. A stereoscopic image pair can be further made into an anaglyph image. An anaglyph image can be displayed on a 2D display, such as a 2D computer monitor. The 3D effect can be perceived by viewing the anaglyph image through a pair of red-blue or red-cyan glasses. Microimages, Inc., for example, provides a "Google Maps Stereoscopic 3D Application" which uses an anaglyph image to overlay the 2D image or 2D map of Google Maps to show 3D effect of the anaglyph image covered area.

However, stereoscopic image pairs or anaglyph images are not available for all geographic areas.

DESCRIPTION OF THE INVENTION

This invention may be embodied in many different forms and should not be construed as limited to the embodiments set forth herein. Instead, these embodiments are provided by way of illustration only and so that this disclosure will be thorough, complete and will fully convey the full scope of the invention to those skilled in the art.

"Two-dimensional ("2D") image" as used herein is one in which the illusion of three-dimensional depth may not be perceived when the image is viewed with both eyes by someone with sufficiently normal binocular vision. A 2D image includes but is not limited to a 2D satellite image, a 2D aerial image, a 2D map, a 2D line map, a 2D map feature, a 2D graphic symbol, or a 2D text label.

"Stereoscopic display" as used herein, is a device on which a stereoscopic 3D image pair may be displayed such that the illusion of three-dimensional depth may be perceived when the image is viewed with both eyes by someone with sufficiently normal binocular vision using 3D eyewear. A stereoscopic display includes a 3D display, including but not limited to a 3D handheld device, a digital 3D monitor and a digital 3D television where stereoscopic 3D may be perceived using a pair of 3D glasses or other suitable 3D eyewear.

"Autostereoscopic display" as used herein, is a device on which a stereoscopic 3D image pair may be displayed in a way that each image can only be seen by each eye such that the illusion of three-dimensional depth may be perceived by someone with sufficiently normal binocular vision without using 3D eyewear. A glasses-free 3D display is an example of an autostereoscopic display. Autostereoscopic displays may be used as displays for 3D computers, 3D televisions and 3D handheld devices for example.

A stereoscopic three-dimensional ("3D") image pair as used herein is a pair of 2D images where, when properly oriented and viewed, the illusion of three-dimensional depth may be perceived when the image is viewed with both eyes, with each eye viewing one of the images (but where both eyes do not view the same image), by someone with sufficiently normal binocular vision.

A three-dimensional ("3D") model as used herein may be a digital 3D model with continuously distributed 3D points, such as a digital elevation model ("DEM") (sometimes also referred to in the art as Digital Terrain Model ("DTM")), digital surface model (DSM) or one or more discrete 3D points (also referred to as a 3D point cloud).

A 3D point as used herein is a 3D position on the ground and whose relative elevation or height is known compared to one or more other positions on the ground or whose absolute elevation or height is known compared to a datum.

"Stereoscopic" is sometimes referred to herein using the short form "stereo".

According to certain embodiments (but not all), the present invention relates to a system and method for generating a stereoscopic image pair from a 2D satellite or aerial image.

According to certain embodiments (but not all), the present invention relates to a system and method for generating a stereoscopic pair of maps from a 2D map.

According to certain embodiments (but not all), the present invention relates to a system and method for generating a stereoscopic pair of labels from a 2D label.

According to certain embodiments (but not all), the present invention relates to a system and method for generating a composite stereoscopic pair from a 2D satellite or aerial image, a 2D map and a 2D label.

According to certain embodiments (but not all), the present invention relates to a system and method for generating a stereoscopic image pair using images taken from different viewing angles, and then generating a stereoscopic pair of maps or labels from a 2D map or a 2D label based on the stereoscopic image pair.

According to certain embodiments (but not all), a stereoscopic pair generated according to certain methods of the present invention may be individually displayed on a 3D display, instead of on a 2D display, by generating an anaglyph image from the stereoscopic pair and displaying the anaglyph image.

According to certain embodiments (but not all), a stereoscopic pair generated according to certain methods of the present invention may be displayed as individual layers on a 3D display, such as a 3D line map on top of a 3D satellite image and a 3D label further on top of the 3D line map. This may for example facilitate the visualization of complex 3D information of a geographic area. Each individual 3D layer may be overlaid on top of another layer or removed from the layers or not displayed based on the needs or preferences of the viewer.

According to certain embodiments (but not all), the present invention relates to a method for generating a stereoscopic 3D image pair from a 2D image. The stereoscopic 3D image pair may be displayed on a stereoscopic display or on an autostereoscopic display.

According to certain embodiments (but not all), the present invention relates to a method for generating a stereoscopic 3D image pair from a 2D image using auxiliary 3D information. The stereoscopic image pair may be displayed on a stereoscopic display or on an autostereoscopic display.

According to certain embodiments (but not all), the present invention relates to a method for generating a stereoscopic 3D line map from a 2D line maps using auxiliary 3D information. The stereoscopic 3D line map pair may be displayed on a stereoscopic display or on an autostereoscopic display.

According to certain embodiments (but not all), the present invention relates to a method for generating a stereoscopic 3D label pair from a 20 label using auxiliary 3D information. The stereoscopic pair of 3D labels may be displayed on a stereoscopic display and on an autostereoscopic display.

According to certain embodiments (but not all), the present invention relates to a method for generating a 3D model using images taken from different viewing angles. The 3D model includes a continuous 3D model and a discrete 3D model such as a 3D point cloud, and using the generated 3D model to generate a stereoscopic 3D image pair from a 2D image.

According to certain embodiments (but not all), the present invention relates to a system including a computer system comprising a processor, and a stereoscopic image pair generator executing on the processor for computationally projecting a 2D image into a stereoscopic image pair with respect to a 3D model, wherein the step of computationally projecting comprises, transferring individual pixels of the 2D image Into proper corresponding positions on a stereoscopic image pair, according to the positions of two pre-determined viewing points using the principle of collinearity condition. The system may further comprise a display that communicates with the processor for displaying a stereoscopic image pair generated by the stereoscopic image pair generator. The system may further comprise a storage component for storing 2D image and 3D model data.

According to certain embodiments (but not all), the present invention relates to a non-transitory computer readable medium storing instructions for executing the methods described herein.

According to certain embodiments (but not all), the present invention relates to a method comprising providing a 2D image, providing a 3D model, and generating a stereoscopic image pair by computationally overlapping the 2D image with the 3D model and computationally projecting the 2D image into a stereoscopic image pair. The step of computationally overlapping includes relating individual pixels of the 2D image to corresponding pixels of the 3D model. The step of computationally projecting the 20 image includes transferring individual pixels of the 2D image into proper positions on a stereoscopic image pair, according to the position of each 2D image pixel, its height in the 3D model and the positions of two pre-determined viewing points. The collinearity principle is used in computationally projecting the 2D image.

According to certain embodiments (but not all), the present invention relates to a method including providing a 2D line map or 2D label, providing a 3D model, generating a stereoscopic pair of 3D line maps or 3D labels by computationally overlapping the 2D line map or 2D label with the 3D model and computationally projecting the 2D line map or 20 label into a stereoscopic 3D line map or 3D label. The step of computationally overlapping comprises relating individual lines of the 2D map or individual 2D labels to their corresponding positions in the 3D model. The step of computationally projecting includes transferring individual lines of the 2D map or individual 2D labels into their proper corresponding positions on a stereoscopic pair, according to the position of each 2D line or 2D label, its height in the 3D model and the positions of two pre-determined viewing points. The collinearity principle is used in computational projecting.

According to certain embodiments (but not all), the present invention relates to displaying stereoscopic pairs individually on a 3D display or displaying them in image layers on a 3D display, such as a 3D label on top of a 3D line map or a 3D line map on top of 3D satellite or aerial image. One 3D layer can be overlapped on top of another layer or removed from another layer based on the needs or preferences of the viewer.

Figure 1:
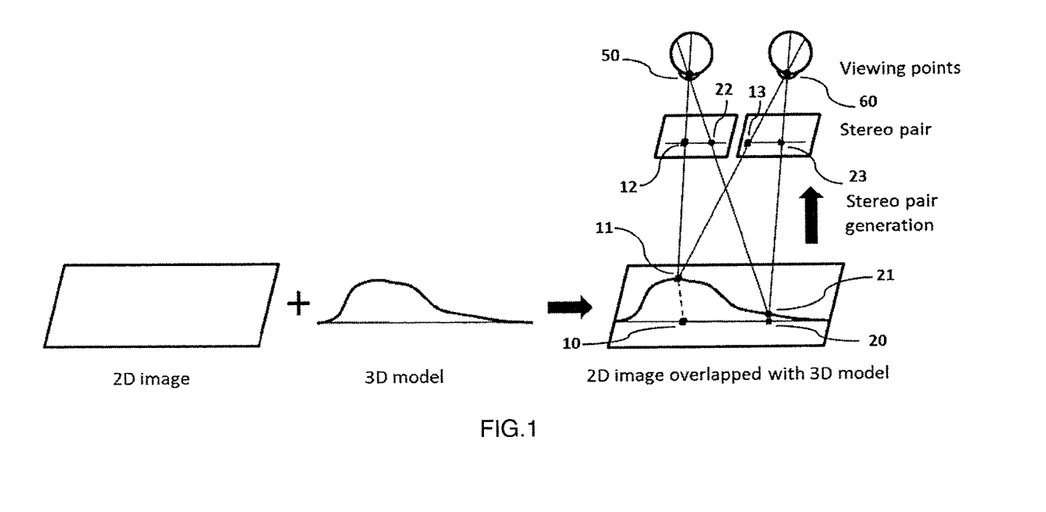
FIG. 1 is a diagram depicting an implementation of a method for generating stereoscopic image pairs of a geographical area according to certain embodiments (but not all) of the present invention.

Referring to FIG. 1, a 2D image and a 3D model are provided. The 2D image is mathematically or digitally or computationally overlapped with the 3D model. A stereoscopic 3D image pair (stereo pair) is generated through a mathematical calculation to transfer or project individual pixels of the 2D image (e.g. 10 and 20 in FIG. 1) into proper positions on the stereoscopic image pair (e.g. 12 and 22 on the first image, and 13 and 23 on the second image), according to the positions of two pre-determined viewing points (50 and 60, one for each image of the stereo image pair), 2D positions of individual pixels of the 2D image (e.g. 10 and 20), and height (3rd dimension) information of corresponding pixels of the 3D model (e.g. height distance from 10 to 11 and height distance from 20 to 21 respectively). The positions of two pre-determined viewing points (50 and 60) are determined based on the base line distance or two human eyes (normally around 65 mm), the normal viewing distance from the eyes to the 3D display (normally arm's length for computer display), the desired 3D orientation (such as north towards up) and the scale of the 2D image. The mathematical calculation used in the transfer relies on the principle of collinearity condition which is known to those skilled in the art of photogrammetry for example. In this embodiment of the present invention, the collinearity condition is satisfied when the 3D position (e.g. 11) of a pixel of the 2D image on the ground, the corresponding position (e.g. 12) of the pixel on one of the stereo image pairs and the corresponding viewing point (e.g. 50) for that stereo image lie on the same straight line.

For illustration purpose, FIG. 1 shows two pixels in the 2D image (10 and 20), their corresponding positions in the 3D model (11 and 21) and their projected pixel positions in the first stereo image (12 and 22) and in the second stereo image (13 and 23). A 2D image comprises a plurality of pixels and every pixel in the 2D image or in a subset of the 2D image is projected into its corresponding positions on the stereo pair, through the process of (i) finding its 3D position in the 3D model and (ii) calculating its positions in the stereo pair according to the collinearity condition and the positions of the two viewing points (50 and 60). Then, a continuous stereo image pair can be produced.

The positions of two pre-determined viewing points (50 and 60) and the viewing distance from the eyes to the 3D display can be changed to achieve different depth effect.

Based on this principle, different variations can be employed to simplify the process of stereo image generation. For example, the original 2D image can be used as one of the two images of the stereo pair. Only the other image of the stereo pair needs to be generated according to individual pixels of the original 2D image, their heights in the 3D model, and the two pre-determined viewing points.

Figure 2:
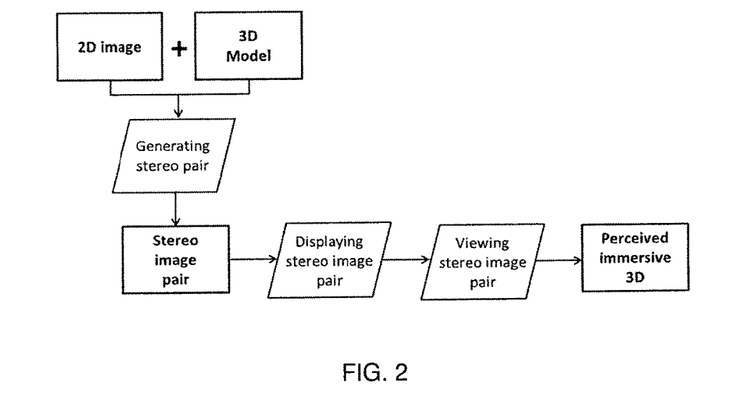
FIG. 2 is a flow chart depicting an implementation of a method for generating stereoscopic image pairs of a geographical area according to certain embodiments (but not all) of the present invention.

Referring to FIG. 2, a 2D image and a 3D model are provided. The 2D image is mathematically overlapped with the 3D model. A stereoscopic 3D image pair is generated through a mathematical calculation to transfer the grey value information of individual pixels of the 2D image into proper positions on the stereoscopic image pair, according to the positions of two pre-determined viewing points (one for each image of the stereoscopic image pair), 2D positions of individual pixels of the 2D image, and height (3rd dimension) information of corresponding pixels of the 3D model. The mathematical calculation used in the transfer relies on the principle of collinearity condition. In this embodiment of the present invention, the collinearity condition is satisfied when the 3D position of a pixel of the 2D image on the ground, the corresponding position of the pixel on one of the stereo image pairs and the corresponding viewing point for that stereo image lie on the same straight line. The stereoscopic 3D image pair is displayed on a 3D display. Depending on the visualization principle of the 3D display, the pair of stereo images can either be alternately displayed on the screen to allow each eye just see one image at a time, or be simultaneously displayed on the screen but with a parallax barrier to allow each eye just see one image. Once displayed, the illusion of three-dimensional depth may be perceived when the stereoscopic 3D image pair is viewed with both eyes by someone with sufficiently normal binocular vision.

Examples of available DEMs include medium resolution DEMs generally available free of charge from the U.S. Geological Survey database and Canadian GeoBase database. Datasets for these DEMs can be used as the 3D model in certain embodiments of methods according to the present invention, including the methods described with respect to FIGS. 1 and 2. DEMs, DSMs and 3D models can also be directly generated using a stereo image pair or a pair of off-nadir images, or more than two images from different viewing angles when, for example, no better DEMs or DSMs are available from existing databases.

Examples of 2D satellite images include globally available medium resolution 2D satellite images from satellites such as Landsat and SPOT image. Such 2D satellite images may be used as the 2D image in certain embodiments of methods according to the present invention, including the methods described with respect to FIGS. 1 and 2. Other satellite images and aerial photos may also be used.

Examples of available 2D maps, 2D line maps, 2D map features, 2D graphic symbols and 2D text labels include vector and raster data from the U.S. Geological Survey database, Canadian GeoBase database and other government or private sources. Such 2D maps, 2D line maps, 20 map features, 2D graphic symbols and 2D text labels as well as their individual elements may be treated as the 2D image in methods according to the present invention.

In certain embodiments of the present invention, by using available 2D images, 2D line maps, 2D map labels, and associated DEMs, stereoscopic image pairs, stereoscopic line map pairs, and stereoscopic map labels may be generated using methods according to the present invention.

In certain embodiments of the present invention, stereoscopic pairs of satellite or aerial imagery, line maps, and map labels of the same geographic area may be generated as individual layers using the methods described with respect to FIGS. 1 and 2.

Figure 3:
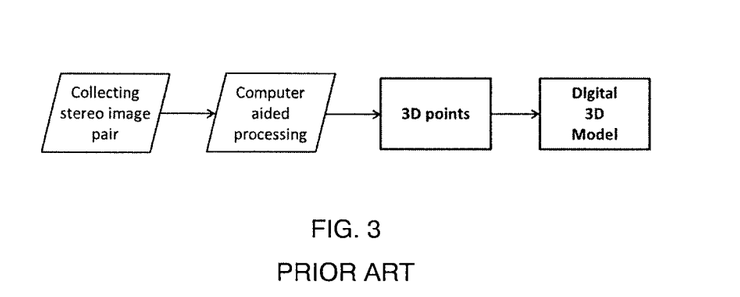
FIG. 3 is a flow chart depicting a prior art method for generating a 3D model from a stereoscopic image pair of a geographical area.

In certain embodiments of the present invention, the corresponding stereo image pairs, stereo line maps and map labels may be displayed on a stereoscopic display or an autostereoscopic display layer by layer.

Where a 3D model is not available or insufficient for a given geographic area, a 3D model may be generated using the prior art method depicted in FIG. 3. A stereoscopic image pair or two off-nadir images for a given geographic area is provided. Computer aided processing is used to generate 3D points (or a 3D point cloud) from the image pair. A digital 3D model is then generated based on the 3D point cloud. It is understood that a 3D point cloud can be generated using more than two images taken from different viewing points. It is also understood that 3D point cloud is another form of 3D model.

Currently, high resolution satellites, such as IKONOS, QuickBird, GeoEye-1, and WorldView-2, can take images from different viewing angles. Suitable pairs of images taken from different viewing angles can form a pair of stereo images. Conventional photogrammetric images taken from airplanes usually have more than 60% overlap between two adjacent photos and may also form stereo image pairs. Using a stereo image pair, stereoscopic 3D may be perceived. Using the same stereo image pair, 3D information may be extracted in the form of 3D points and/or a 3D model. This is useful for generating high resolution 3D models for geographic areas for which high resolution 3D models are not generally available.

A direct use of high resolution satellite image pairs or aerial image pairs for large scale 3D visualization may create two major difficulties for online 3D mapping. One difficulty is the exaggeration of 3D depth caused by too large of a viewing angle difference between the two images. This not only distorts the height perception, but also causes discomfort in viewing the 3D. The other difficulty is the orientation of the stereo image pair. Normally, images in an online mapping system are oriented with north towards up (i.e., north oriented). But stereo image pairs composited directly by two images from different viewing angles are often not north oriented, causing difficulties in 3D visualization and overlapping with 3D line maps.

Using methods according to certain embodiments of the present invention, a new pair of high resolution satellite images with a proper viewing angle difference and north orientation can be reconstructed according to two pre-determined viewing points. The reconstruction process includes the following steps: using a provided image pair to generate a digital 3D model (e.g. see FIG. 3); using the generated 3D model and one of the provided images of the provided image pair to project the provided image into a pair of stereo images according to the two pre-determined viewing points (e.g. see FIGS. 1 and 2). The 3D model may be further used to project a 2D line map and 2D map label into a stereoscopic pair of line maps and stereo pair of map labels.

Figure 4:
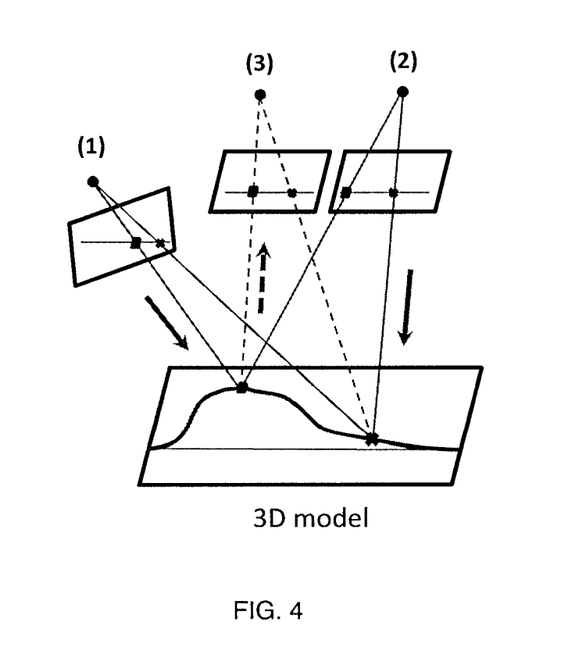
FIG. 4 is a diagram depicting an implementation of a method for generating north-oriented stereoscopic image pairs of a geographical area based on two off-nadir images of different viewing angles according to certain embodiments (but not all) of the present invention.

An example of generating a large-scale stereoscopic image pair, line pair or label pair with proper 3D depth and north orientation is illustrated in FIG. 4, which comprises the steps of:

1. Using images taken from different viewing angles, e.g. images (1) and (2) in FIG. 4, to generate a 3D model (using more images from different viewing angles may generate a more accurate 3D model; not illustrated in FIG. 4);
2. Using the generated 3D model and one of the images, such as image (2) in FIG. 4, to generate a new image (3), where the baseline distance between image (2) and image (3) is predefined based on the baseline distance of human eyes and the normal viewing distance from the eyes to the display screen so that a realistic depth perception will be visualized, and the baseline of images (2) and (3) goes in an east-west direction so that the stereo pair is north oriented;
3. The 3D model may be further used to project a 2D fine map and 2D map label into a stereoscopic pair of line maps and stereo pair of map labels; and
4. The generated 3D model can be a virtual 3D model, but doesn't necessarily need to be generated into a digital model, as long as the 3D information of each 2D pixel, 2D line or 2D label can be calculated from images (1) and (2) to re-project the 20 pixel, 2D line or 2D label into a new stereoscopic pair.

Figure 5:
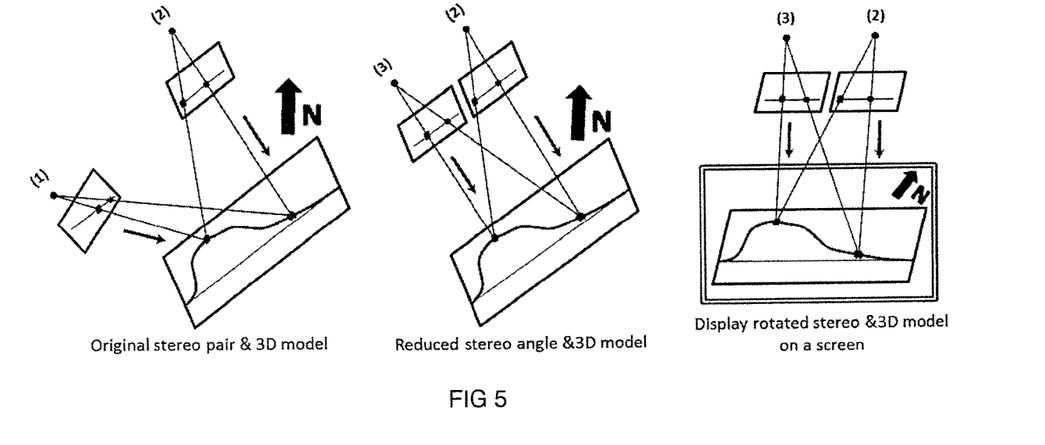
FIG. 5 is a diagram depicting an implementation of a method for generating non-north-oriented stereoscopic image pairs of a geographical area based on two off-nadir images of different viewing angles according to certain embodiments (but not all) of the present invention.

An example of generating a large-scale stereoscopic image pair, line pair and label pair with proper 3D depth but without north orientation is illustrated in FIG. 5, which comprises the steps of:

1. Using images taken from different viewing angles, e.g. images (1) and (2) in FIG. 5, to generate a 3D model (using more images from different viewing angles may generate a more accurate 3D model; not illustrated in FIG. 5);
2. Using the generated 3D model and image (2) to generate a new image (3), where the baseline distance between image (2) and image (3) is predefined based on the baseline of human eyes and the normal viewing distance from the eyes to the display screen so that a realistic depth perception will be visualized, and the baseline between image (2) and image (3) goes in the same direction as the original stereo pair;
3. The 3D model may be further used to project a 2D line map and 2D map label into a stereoscopic pair of line maps and stereo pair of map labels; and
4. Rotating the stereo image pair (2) and (3) with the image baseline and eye baseline parallel to the horizontal pixel lines of the display.

If a pair of images with proper 3D depth can be found, they can be directly used for 3D visualization. They can also be used to generate a 3D model for producing stereo line maps and stereo labels.

Currently, large scale 2D line maps exist for many places in the world. Using existing 2D line maps and 3D points or a 3D model generated from high resolution satellite image pairs or aerial image pairs, large scale stereo line maps and corresponding stereo map labels may be generated using methods according to certain embodiments of the present invention, including methods described with respect to FIGS. 1 and 2. If high resolution 3D models are available from existing data sources such as LiDAR data, they may be used, instead of generating them from high resolution images. Resulting high resolution stereo images and the large scale stereo line maps and map labels may be displayed on a 3D digital display for large scale 3D visualization.

Using the methods according to certain embodiments of the present invention including methods described with respect to FIGS. 1 and 2, stereoscopic line maps and map labels can also be obtained by drawing on a 3D display. With a 3D image scene as a background, a viewer may draw a line on the perceived 3D image scene. A stereoscopic line may then be created based on its corresponding position on the 3D model. If a 3D model is not available, the viewer may create a stereoscopic line by manually adjusting the perceived height of the line using a computer mouse or other device until the line rests on the surface of the perceived 3D terrain. The same principle may be applied to creating a pair of stereoscopic labels.

It will be understood by a person skilled in the art that a stereoscopic 3D image pair may be displayed at the time of its generation or at another time. For example, a stereoscopic 3D image pair may be generated and then stored in memory and displayed at a later time.

The methods according to the present invention are computerized processes and may be implemented on general purpose computers or other suitable computing devices which when programed, can form systems according to embodiments of the present invention.

Figure 6:
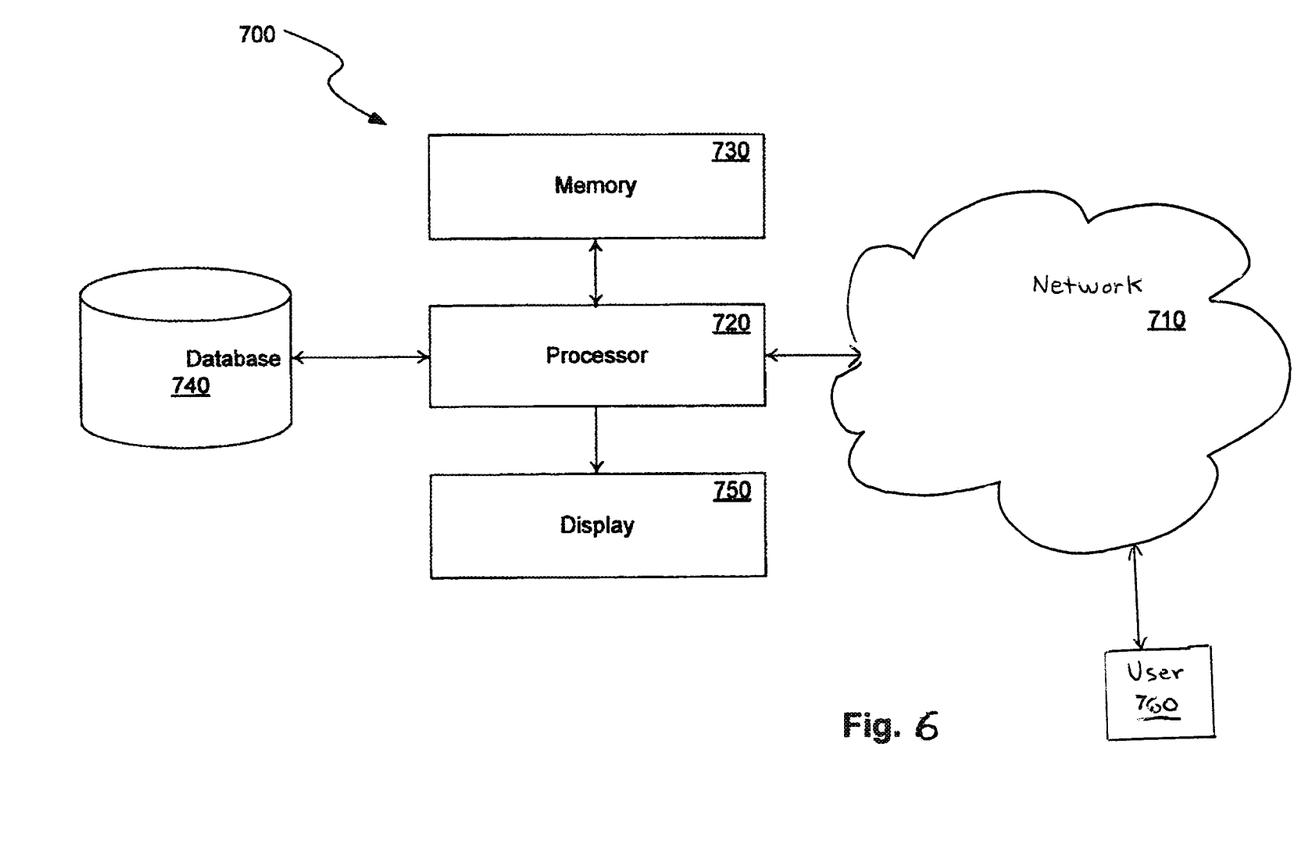
FIG. 6 is a high-level block diagram of an example computing environment for a system in which the methods according to the present invention may be implemented.

FIG. 6 is a high-level block diagram of an example computing environment 700 for a system in which the methods according to the present invention may be implemented.

The environment 700 includes a processor 720 for performing the methods described above. Image data such as 2D image data and 3D image pair data and 3D model data may be stored in database 740 and in memory 730 when needed. The processor 720 may be used for executing instructions for processing steps in the methods described above. Data and images may also be sent to and from the processor 720 over network 710. A user 760 may access the environment 700 directly or over the network 710 (such as for cloud computing applications).

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

I claim:
1. A computational method comprising:
   providing a 2D image covering a geographical area larger than one individual image scene,
   providing a 3D model covering the geographical area,
   generating a continuous stereoscopic image pair of the geographical area by computationally and continuously projecting adjacent sub-areas within the 2D image into adjacent sub-stereoscopic image pairs with respect to the 3D model, wherein the step of computationally projecting comprises transferring individual pixels of the sub-areas of the 2D image into proper corresponding positions on the sub-stereoscopic image pairs, according to the positions of two pre-determined viewing points using the principle of collinearity condition, whereby an object point, its corresponding image point and the viewing point corresponding to the image lie on a straight line.

2. The method of claim 1, wherein the 2D image is a satellite image or an aerial image and the stereoscopic image pair is a satellite image pair or an aerial image pair.

3. The method of claim 1 wherein the 2D image is a line map or a map label and the stereoscopic image pair is a line map image pair or a map label image pair.

4. The method of claim 1 further comprising the step of displaying the stereoscopic image pairs individually or layer by layer such that stereoscopic 3D may be perceived by a viewer.

5. The method of claim 1, further comprising the step of storing the stereoscopic image pair in a storage component in a computing environment.

6. The method of claim 5, further comprising the step of transmitting the stereo image pair over a network to a user computer or handheld device.

7. The method of claim 6, further comprising displaying stereo image pair on the user computer or handheld device.

8. The method of claim 1, wherein the steps of providing a 2D image and a 3D model comprise transmitting the 2D image and 3D model over a network to a user computer or handheld device.

9. The method of claim 8, wherein the step of computationally projecting the 2D image into the stereoscopic image pair is carried out on a user computer or handheld device.

10. The method of claim 9, further comprising displaying the stereo image pair on the user computer or handheld device.

11. A non-transitory computer readable medium storing computer executable instructions for carrying out the steps of claim 1.

12. The method of claim 1, further comprising:
generating one or more additional stereoscopic image pairs for one or more additional adjacent sub-areas of the geographical area covered by the 2D image, comprising,
changing the positions of two pre-determined viewing points for each of the additional sub-areas, and
repeating the computationally projecting steps for each of the additional sub-areas using the two pre-determined viewing points changed for each additional sub-area,
whereby a continuous stereoscopic image pair is generated covering the first sub-area and the additional sub-areas.

13. The method of claim 12, wherein the pre-determined viewing points are from a top-down view or from a top-down side view.

14. The method of claim 12, wherein the 2D image is comprised of two or more image scenes.

15. The method of claim 12, wherein the pre-determined viewing points are from a top-down view or from a top-down side view.

16. The method of claim 12, wherein the 2D image is comprised of two or more image scenes.

17. A computational method comprising:
providing two or more 2D images for each sub-area of a geographical area taken from different viewing points, where the two or more 2D images comprise overlapping images of adjacent sub-areas within the geographical area,
generating a digital 3D model for the geographical area from the 2D images for each of the sub-areas, and
using the 3D model and one of the provided 2D images from each of the sub-areas to continuously project the pixels of the provided 2D images into the adjacent pairs of stereo images to continuously cover the geographical area according to two pre-determined viewing points.

18. The method of claim 17 further comprising using the 3D model to project a 2D line map and 2D map label into the stereo pair to generate a stereo pair of line maps and a stereo pair of map labels.

19. The method of claim 17, wherein the steps are carried out in a computing environment.

20. The method of claim 19, further comprising the step of storing the stereo image pair in a storage component in the computing environment.

21. The method of claim 19, further comprising the step of transmitting stereo image pair over a network to a user computer or handheld device.

22. The method of claim 21, further comprising displaying the stereo image pair on the user computer or handheld device.

23. The method of claim 17, wherein the step of using the 3D model and one of the provided images further comprise transmitting the 2D image and 3D model over a network to a user computer or handheld device.

24. The method of claim 23, wherein the step of computationally projecting the 2D image into the stereoscopic image pair is carried out on a user computer or handheld device.

25. The method of claim 24, further comprising displaying stereo image pair on the user computer or handheld device.

26. The method of claim 17, further comprising:
generating one or more additional stereoscopic image pairs for one or more additional adjacent sub-areas of the geographical area covered by the 2D image, comprising,
changing the positions of two pre-determined viewing points for each of the additional sub-areas, and
repeating the computationally projecting steps for each of the additional sub-areas using the two pre-determined viewing points changed for each additional sub-area,
whereby a continuous stereoscopic image pair is generated covering the first sub-area and the additional sub-areas.

27. A system comprising:
a computer system comprising a processor, and
a continuous stereoscopic image pair generator executing on the processor for computationally projecting a 2D image covering a geographical area larger than one individual image scene into a stereoscopic image pair covering the geographical area by continuously projecting adjacent sub-areas within the 2D image into adjacent sub-stereoscopic image pairs with respect to a 3D model covering the geographical area, wherein the step of computationally projecting comprises
transferring individual pixels of the sub-areas of the 2D image into proper corresponding positions on the sub-stereoscopic image pairs, according to the positions of two pre-determined viewing points using the principle of collinearity condition, whereby an object point, its corresponding image point and the viewing point corresponding to the image lie on a straight line.

28. The system of claim 27, further comprising a display that communicates with the processor for displaying the stereoscopic image pair generated by the stereoscopic image pair generator.

29. The system of claim 27 further comprising a storage component for storing 2D image and 3D model data.

30. The system of claim 27 further comprising a storage component for storing the stereo image pairs.

31. The system of claim 27 further comprising a storage component for storing the stereo image pairs as tiled stereo image pairs for efficiently transferring a portion of the stereo image pair through the Internet or other network to a remote user and displaying the transferred portion of stereo image pair on the user's computer, handheld device or display device.

32. The system of claim 27 further comprising a storage component for storing the 2D image and 3D model data as tiled 2D image and 3D model for efficiently transferring a portion of the 2D image and 3D model through the Internet or other network to a remote user's computer or handheld device for generating stereoscopic image pair from the transferred portion of 2D image and 3D model and displaying the generated stereo image pair on the user's computer, handheld device or display devise.

33. The system of claim 27, further comprising a memory for storing the 2D image and 3D model data and the stereoscopic image pair.

34. The system of claim 27, wherein the system comprises a computer, a handheld device or a display device.

35. The system of claim 34, wherein the computer, handheld device or display device comprises a 3D display.

* * * * *